United States Patent

Orr et al.

[11] Patent Number: 5,102,036
[45] Date of Patent: Apr. 7, 1992

[54] FORMABLE REUSABLE ENCLOSURE

[76] Inventors: Joseph A. Orr; John R. Orr, both of 5565 17th Ave., SW., Naples, Fla. 33999

[21] Appl. No.: 540,571
[22] Filed: Jun. 19, 1990
[51] Int. Cl.⁵ .................................... B65D 65/02
[52] U.S. Cl. ............................. 229/89; 229/90; 220/903
[58] Field of Search .................. 229/89, 90, 93; 215/100.5, 11.6, 12.1; 150/901; 220/903

[56] References Cited

U.S. PATENT DOCUMENTS

| | | | |
|---|---|---|---|
| 228,002 | 5/1880 | Swope | 229/89 |
| 234,582 | 11/1880 | Kacer | 229/89 |
| 248,770 | 10/1881 | Mark et al. | 229/89 |
| 502,951 | 8/1893 | Clark | 229/89 |
| 668,705 | 2/1901 | Baskerville | 229/90 |
| 1,158,581 | 11/1915 | Swift, Jr. | 229/90 |
| 2,357,147 | 8/1944 | Taylor | 229/89 |
| 3,305,161 | 2/1967 | Offer | 229/93 |
| 3,654,049 | 4/1972 | Ausnit | 220/903 |
| 3,908,523 | 9/1975 | Shikaya | 229/1.5 |
| 4,242,387 | 12/1980 | Ward | 220/85 |
| 4,282,279 | 8/1981 | Strickland | 220/903 |
| 4,478,265 | 10/1984 | DeMarco | 220/85 |
| 4,583,577 | 4/1986 | Canfield | 229/89 X |
| 4,846,394 | 7/1989 | Swanson | 229/93 X |

Primary Examiner—Stephen Marcus
Assistant Examiner—Jes F. Pascua
Attorney, Agent, or Firm—Merrill N. Johnson

[57] ABSTRACT

A formable reusable enclosure is disclosed for use as a container wrap, a mailing tube, or the like. One specific embodiment of the enclosure comprises a pliable, elongated, substantially rectangular panel member having opposing ends and a tongue portion extending from one of the opposed ends. The panel member has an outer layer of bendable kraft board and an inner layer of corrugated paper adhered to the kraft board. The panel member is adapted to be formed into an enclosure by bending the panel member into the configuration of the peripheral wall of a container with the tongue portion overlapping the opposing end of the panel member. A slot is formed through the panel member adjacent to the end which is opposite to the tongue portion end. The slot has an engagement edge aligned parallel to the corrugations in the inner paper layer, enabling adjustment of the size of the enclosure by selecting a desired corrugation for engagement with the slot edge. The selected corrugation locks against the engagement edge when the tongue portion is inclined at an acute angle with respect to the outer kraft paper layer, thereby preventing the tongue portion form withdrawing from the slot.

7 Claims, 1 Drawing Sheet

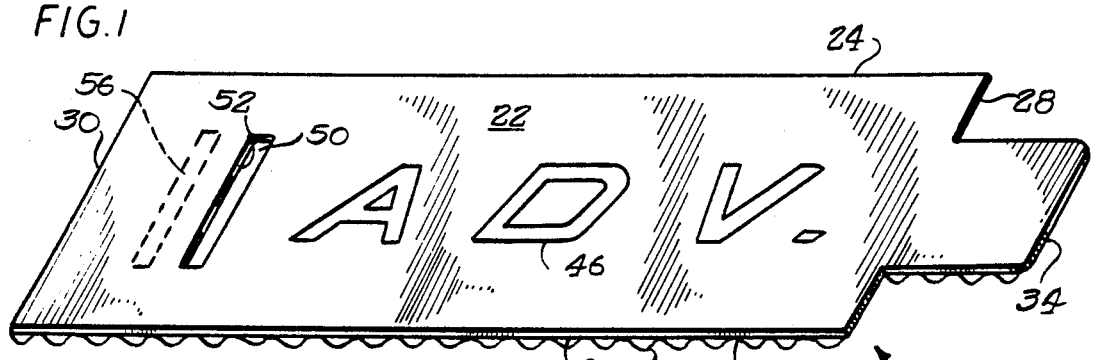
FIG. 1
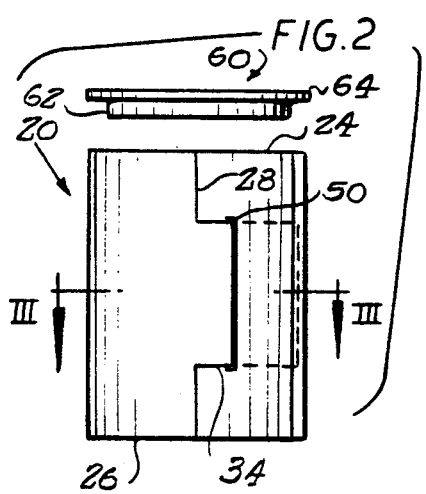
FIG. 2
FIG. 3
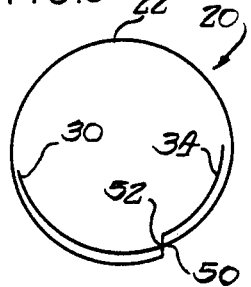
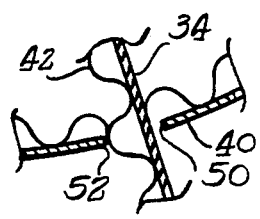
FIG. 4
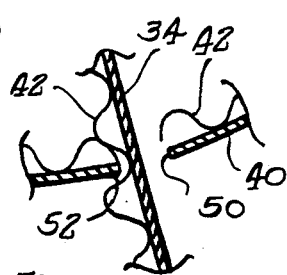
FIG. 5
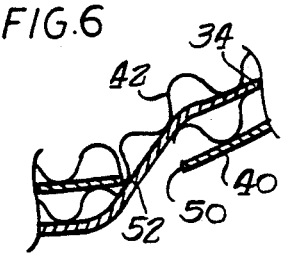
FIG. 6
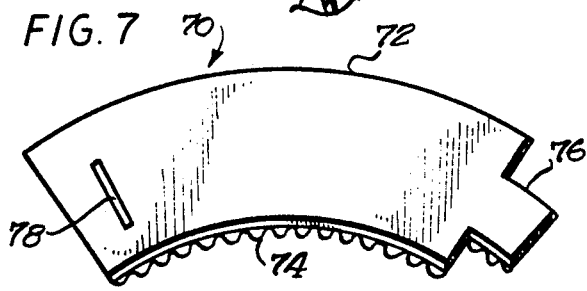
FIG. 7
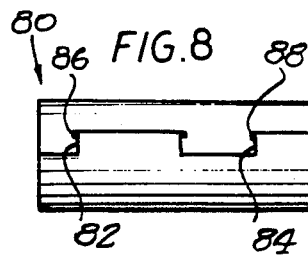
FIG. 8
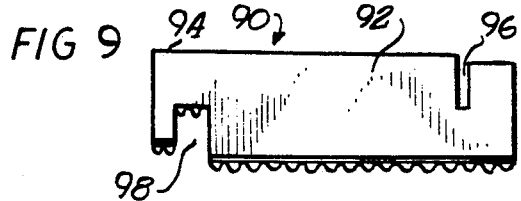
FIG. 9
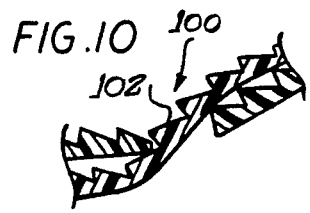
FIG. 10

FORMABLE REUSABLE ENCLOSURE

BACKGROUND OF THE INVENTION

1. Field of the Invention

This invention relates generally to formable reusable enclosures, and more particularly to such enclosures that may be compactly stored and packed for shipping, which are inexpensive to manufacture, and which may be used for gripping insulating enclosures for containers and for mailing tubes and the like.

2. Description of the Prior Art

It is known in the prior art to insulate a container to maintain the contents at a pre-established warm or cold temperature. Many containers, such as paper cups, bottles and cans, are used as single serving dispensers of beverages which are intended to be consumed while the beverage is still hot or chilled. Normally the single service containers are used upon filling with a hot or cold beverage or upon removal from a refrigerator. If consumption is rapid enough, the beverage is consumed while still at least somewhat warm or chilled. However, in low or high temperature environments the temperature of the liquid may rise or fall rapidly. Thus, various insulating enclosures have been developed.

Further, condensation on the external surface of such containers may present problems. With chilled liquids condensate forms quickly on the sides of the containers, and runs down the sides to join the condensate formed on the bottom of the container. This results in slippery container sides which makes them messy to handle and difficult to grip and in puddles on any support surface.

Conventional container insulating jackets are available which are formed of vinyl or polyurethane tubing, and are usually rather rigid. Packaging of such insulators during both transportation and sale requires an inordinate amount of volume and space which isn't commensurate with the sales price and profit margins.

The just discussed volume and space requirements also apply to enclosures used for mailing tubes and the like.

To overcome the just described space and volume problems, a number of enclosures have been designed which can be shipped flat. In U.S. Pat. No. 228,002 a bottle wrapper is disclosed which consists of a flat sheet which is rolled into a tube shape with the edges detachably united by a hook-shaped tongue which is inserted into a slot. This bottle wrapper does not have any size adjustment capability or real insulating qualities, and the hook/slot arrangement is inherently unstable in retaining the rolled sheet in a cylindrical shape.

U.S. Pat. No. 234,582 discloses a bottle wrapper formed by rolling a sheet of paper board into a tube shape. The paper board has numerous holes formed therethrough with ragged edges projecting on the inner side. The tube is retained against unrolling by vertical, opposed slots formed in the ends of the sheet which are mutually engaged. This wrapper does not have any size adjustment capability, has minimal insulating qualities, and the vertically opposed slots are also inherently unstable in retaining the rolled sheet in a cylindrical shape. The ragged holes on the inner side of sheet cannot help stability of alignment because adjacent lines of holes have the holes offset from the next line so there is nothing for the ragged edges to catch on to maintain alignment, leaving only the pivot point at the ends of the slots to hold the tube in a cylinder shape.

The bottle wrapper in U.S. Pat. No. 248,770 also lacks insulating qualities, size adjustment capabilities, and the tongue/slot arrangement is also inherently unstable in maintaining a desired shape.

U.S. Pat. No. 502,951 discloses a fruit jar protector formed from single wall corrugated board which is rolled into a tube. While there is a stability to the tube shape because the ends of the rolled tube are secured together with a strip of adhesive tape, there is no inherently available means for adjusting the size of the enclosure. Moreover, the user would be required to carry spare adhesive strips all of the time to join the ends of the tube and find a way to properly dispose of used strips.

Other formable reusable enclosures available in the prior art have similar and/or additional deficiencies, and are generally much more expensive to manufacture.

It is therefore an object of this invention to provide an improved formable reusable enclosure which may be used as an insulated container wrap, a mailing tube, a tubular or other shaped receptacle, or the like.

It is a further object of this invention to provide a formable reusable enclosure which may be stored or shipped in a planar configuration, but may be formed into an enclosure and held in a stable enclosure configuration with a locking means which is included in the planar structure.

It is a further object of this invention to provide an improved enclosure as described in the preceding paragraph which has insulating, gripping, condensate reduction and size adjustment features.

Other objects, advantages and features of the invention will become apparent when the following description is taken in conjunction with the accompanying drawings.

SUMMARY OF THE INVENTION

The invention is disclosed in a first specific embodiment which is particularly useful as a container wrap. A pliable, elongated, substantially rectangular member has opposing ends and a tongue portion extending from one of the opposed ends. The panel member has an outer layer of pliable kraft board which will bend or roll into a container surrounding configuration without appreciably distorting the outer surface. The panel further has an inner layer of corrugated paper adhered to the kraft board for gripping and supporting the sides of a container.

When the panel member is rolled or formed into the configuration of the peripheral wall of a container, the tongue portion overlaps the outer layer of the opposing end of the panel member. A slot is formed through the panel member adjacent to the end which is opposite to the tongue portion end. The slot has an engagement edge aligned parallel to the corrugations of the inner paper layer on the tongue portion, enabling adjustment of the size of the enclosure by selecting a desired corrugation for engagement with the slot edge.

This arrangement also allows the selected corrugation on the tongue portion to be locked into a tongue holding position in the slot against the engagement edge when the tongue portion remaining outside of the slot is inclined at an acute angle with respect to the outer kraft paper layer. The cooperating slot engagement edge and locking corrugation are preferably of a length to provide a stable enclosure configuration.

To generically describe all of the embodiments disclosed herein a pliable panel member has top, bottom, first end, and second end edges and is adapted to be formed into an enclosure configuration by bringing the first and second end edges toward and past each other into a panel overlapping position with a tongue portion on the outside and with the top and bottom edges defining upper and lower perimeters of openings of the enclosure so formed.

The panel member has outer and inner surfaces when formed into an enclosure. The inner surface of at least the tongue portion of the panel member has alternating ridges and valleys or grooves formed thereon to provide a corrugated inner surface.

Means provided for retaining the panel member in the enclosure configuration includes slot means formed through the panel member adjacent the other of said first and second end edges for receiving the tongue portion. The slot means has edge means for retaining corrugation edges or grooves. The tongue portion is adapted to be inserted into the slot means in a position whereby a groove in the corrugated inside surface of the tongue portion is engaged by the groove retaining edge of the slot means to maintain the panel member in the enclosure configuration.

A plurality of different tongue portion/slot configurations are disclosed in the various embodiments. In the first embodiment the slot means is a closed end slot formed in the panel member between the top and bottom edges, while the tongue means is a straightforward projection from the end edge of the panel which preferably has a width substantially the same as the length of the slot to enhance the stability of the enclosure configuration. The width dimension of this slot is preferably only slightly larger than the thickness of the tongue portion measured through the ridge part of the corrugated surface, so that the slot will readily admit the tongue when the tongue is substantially perpendicular to the panel but which will assist in moving a groove on the tongue surface into engagement with the groove retaining edge of the slot when the tongue is disposed at an acute angle with respect to the panel.

The second embodiment has arcuately shaped top and bottom edges, so that a frustro-conical enclosure is formed. However, the slot and tongue means are substantially the same as in the first embodiment, except that the corrugations are radially aligned from bottom to top of the panel and tongue with the slot being similarly aligned to engage a corrugation.

In the third embodiment a plurality of tongue/slot combinations are shown for longer enclosures to improve the stability of the enclosure configuration. Each of these combinations are the same as the combination shown in the first embodiment.

In the fourth embodiment the tongue/slot combination is somewhat different. In previous embodiments the tongue width has been less than the distance between the top and bottom edges of the panel and located intermediate those edges. In the fourth embodiment, the tongue preferably has one edge extending along the same line as either the top or bottom. The slot means is an open-ended slot, with the open end being in the same edge of the panel as the tongue edge extension and the slot cut toward the middle of the panel. The tongue also has a second open-ended slot, with the open end being in the edge opposite to the tongue extension edge with this second slot cut toward the middle of the tongue.

Thus, in the fourth embodiment the tongue is engaged with the slot means of the panel member by sliding the open ends of the two slots together to interlock and form the enclosure. The same locking function as featured in the other embodiments still occurs, however, because the panel slot has an engagement edge to receive a corrugation groove or corrugation ridge to hold the tongue locked in the slot.

To achieve the same adjustment feature as the other embodiments, the second slot in the tongue has a width which spans a plurality of corrugations. Thus, a plurality of spaced corrugations are available to engage the locking edge of the panel slot to adjust the size of the enclosure.

The kraft board/corrugated paper combination may be the choice in many instances, because it is the least expensive and has advantages in dealing with condensate by absorbtion. However, the locking feature can be obtained by manufacturing the panel and tongue from plastic or other material, and with a corrugated surface formed on the inner surface.

BRIEF DESCRIPTION OF THE DRAWINGS

In the drawings, where like numerals are employed to designate like parts throughout:

FIG. 1 is an axonometric projection of a first embodiment of the teachings of this invention;

FIG. 2 is a side elevational view of the panel member of FIG. 1 formed into an enclosure;

FIG. 3 is a cross-sectional view of the enclosure of FIG. 2 taken along lines III—III, showing the tongue/slot cooperation in a diagrammatic illustration;

FIG. 4 is an enlarged partial cross-sectional view of tongue/slot relative positions when inserting or removing the tongue from the slot;

FIG. 5 illustrates the cooperative movement of tongue and slot to engage a groove with the edge of the slot;

FIG. 6 illustrates the final cooperative positions of tongue and slot in the locking position;

FIG. 7 is an axonometric projection of a second embodiment of the invention which may be used to form a frustro-conical enclosure;

FIG. 8 is a side elevation view of a third embodiment of the invention;

FIG. 9 is an inclined view of a panel member illustrating a fourth embodiment of the invention; and FIG. 10 is an enlarged partial cross-sectional view of a tongue/slot combination made of different material to provide the locking feature of this invention.

DESCRIPTION OF THE PREFERRED EMBODIMENTS

Referring now to FIGS. 1 through 6, there is illustrated a formable reusable enclosure indicated generally at 20 which is a first embodiment of the teachings of this invention.

A pliable panel member 22 has top, bottom, first end and second end edges 24, 26, 28 and 30. The panel member 22 further includes a tongue portion 34 extending from one of the first and second end edges for connecting the ends of the panel member 22 together.

The panel member 22 is adapted to be formed into an enclosure configuration as shown in FIG. 2 by bringing first and second end edges 28, 30 toward and past each other into a panel overlapping position with the tongue portion 34 on the outside and with the top and bottom edges 24, 26 defining upper and lower perimeters, respectively, of openings of the enclosure so formed.

The panel member 22 has an outer layer or surface 40, preferably of bendable kraft board, and an inner corrugated layer or surface 42, preferably of corrugated paper, adhered to the outer layer. The weight or stiffness of the kraft board and the corrugated paper will depend upon the size of enclosure to be formed, the compressibility of the corrugated paper layer which is desired, the degree of absorbency required, and other selectable design features. The height and spacing of the grooves and ridges is also variable depending upon design features desired, e.g. the spacing determines the increments of adjustment of size when forming an enclosure. The exterior of the outer layer 40 may be calendered or otherwise prepared to receive logos, advertisements or other printed, multi-color messages such as indicated at 46.

A single closed end slot 50 is formed through the panel member 22 adjacent the other of the first and second end edges 28, 30 for receiving the tongue portion 34. The slot 50 has an edge 52 for engaging a corrugation groove or ridge, as will be described hereinafter.

A second slot 56 may be die cut with perforated lines enabling it to be punched out by the user. If it is used, the tongue portion 34 may be inserted into the first slot 50 and threaded back out through slot 56 for additional holding power in some applications.

FIGS. 3 and 4 illustrate the rolling of the panel member 22 into a cylindrical configuration with the tongue portion 34 inserted through slot 50. FIG. 4 illustrates how the tongue portion 34 that is inserted through the slot 50 will be pressed outwardly in an arcuate configuration by a container or other object inside the enclosure.

FIGS. 4, 5 and 6 illustrate the locking feature of this invention. FIG. 4 illustrates the relative positions of tongue portion 34 with respect to slot 50 when the tongue portion 34 is being inserted into or removed from slot 50. The width dimension of slot 50 is preferably only slightly larger than the thickness dimension of the tongue portion 34 measured through a ridge of the corrugated surface, whereby the slot 50 will readily admit the tongue portion 34 when the tongue portion 34 is substantially perpendicular to the panel member area surrounding the slot—or perpendicular to a tangent of a circular enclosure at the slot. These dimensions will assist in moving a groove or ridge of the corrugated layer 42 on the tongue 34 into engagement with the groove/ridge retaining edge 52 of slot 50 as noted in FIG. 5.

As the area of the tongue portion 34 outside of slot 50 is inclined or disposed at an acute angle with respect to the panel wall as shown in FIG. 6, the contact of the tongue 34 inside the enclosure with the other edge of the slot 50 (or with the corrugated layer 42 on the inside of panel 22) will hold a selected groove and/or ridge of the corrugated layer 42 against the engagement or retaining edge 52 of slot 50, preventing withdrawal of the tongue 34 from slot 50. In addition, if the enclosure is used for a container wrap the container will press the tongue outwardly, assisting in retaining the lock against tongue withdrawal.

The closed end slot 50 preferably has a length which is substantially the same as the width of the tongue 34, which works with the similar close dimensions of slot width/tongue thickness to enhance the stability of the enclosure. It is important to note that the length of contact between the slot engagement edge and the tongue groove/ridge components are particularly useful in maintaining stability of the enclosure. This feature is achieved by the alignment of the slot 50 in parallel relationship with the corrugations of the inner layer 42. Moreover, this alignment adds strength to the locking feature. Such stability and locking strength are particularly important for the longer enclosure embodiments, such as shown in FIG. 8, which may be used for mailing tubes, storage receptacles or the like.

If the embodiment disclosed in FIGS. 1 through 6 is used as a container wrap, the weight and absorbency of the corrugated layer 42 should be carefully selected. Although made of kraft paper and corrugated paper such a container wrap may be reused many, many times if the corrugated paper has sufficient resiliency to recover between uses. However, if the absorbency characteristics of the corrugated paper are selected carefully, the resultant condensate absorbtion of the corrugated paper will create a gripping bond between the container and the corrugated paper which prevents slippage between the peripheral wall of a container and the enclosure. In fact, selection of the proper corrugated paper enables holding the container in the enclosure with the bottom of the container held above a surface supporting the bottom of the enclosure, e.g. a table. This prevents condensate collection directly from the container on the table. If the absorbency is good enough, no condensate will run down the inside of the enclosure onto the table thus avoiding the need for a coaster.

Referring again to FIG. 2, there is illustrated a closure means indicated generally at 60 for closing one or both openings at the ends of the enclosure to form a partially or completely closed enclosure or receptacle. One such closure could be used as a bottom for an enclosure to provide an open top receptacle with many storage uses. Further, if such a closure were used with a container wrap, it could prevent completely the deposition of condensate on a table, etc.

The closure 60 may be made from molded plastic or pressed paper or the like. An insert portion 62 is sized to fit within the opening, whether the opening is circular, triangular, square, etc. It is further sized so that the corrugated paper inner layer 42 will grip and retain portion 62 holding the closure 60 in place. A rim or lip 64 is larger than insert portion 62 so that it will cover the outer perimeter of the opening, thus cutting off any exits from the interior of the enclosure out through the grooves along the sides of the corrugated layer.

If closures 60 are used at both ends of the embodiment shown in FIG. 8, a receptacle is formed suitable for use as a mailing tube, blue print storage, etc. For heavy duty use, adhesive strips or other adhesive means may be used to further securely attach the closures 60 to the enclosure tube.

Referring now to FIG. 7, there is illustrated a second embodiment of the teachings of this invention. A panel member indicated generally at 70 has top and bottom edges 72, 74 which are each arcuately shaped, with the arcs opening in the same direction. The ends of the panel member 70, the corrugation alignment of the inner layer, the slot 78 and the tongue portion 76 are all radially aligned. Thus, when tongue 76 is inserted into slot 78, the corrugations on the inner layer of tongue 76 are aligned with the retaining or engagement edge of slot 78 to provide the locking feature discussed hereinbefore. When formed into an enclosure in the same fashion as noted hereinbefore, a frustro-conical enclosure is provided which is suitable for holding similarly shaped containers, etc., such as paper or plastic cups.

Referring now to FIG. 8 a third embodiment comprising an enclosure 80 is illustrated in which a plurality of tongue portions 82, 84 are provided for insertion into a corresponding or like plurality of slots 86, 88, respectively. The plurality of tongues and slots, each with its locking feature, enables the formation of extended length or elongated enclosures which may be used as mailing tubes, storage receptacles or the like.

Referring now to FIG. 9, there is illustrated a fourth embodiment of the teachings of this invention. While the novel features of the previous embodiments are retained in this embodiment, the tongue/slot combination is somewhat different. The enclosure 90 has a panel member 92 with a tongue portion 94 which preferably has one edge extending along the same line as either the top or bottom edge of the panel 92. The slot means 96 is an open-ended slot, with the open end being cut in the same panel edge as the tongue edge extension and the slot cut toward the middle of the panel 92. The tongue 94 also has a second open-ended slot 98, with the open end being in the edge opposite to the tongue extension edge and the second slot being cut toward the middle of the tongue.

In this embodiment, the tongue 94 is engaged with the slot means 96 by sliding the open ends of the two slots 96, 98 together to interlock and form the enclosure. The same locking function as featured in the other embodiments still occurs, because the panel slot 96 has an engagement edge to receive a corrugation groove or ridge to hold the tongue 94 locked in slot 96.

To achieve the same size adjustment feature as provided in the other embodiments, the second slot 98 in tongue 94 has a width which spans a plurality of corrugations. Thus, a plurality of spaced corrugations are available to engage the locking retaining edge of panel slot 96 to adjust the size of the enclosure.

Referring now to FIG. 10, there is illustrated the use of alternative materials to form a panel member 100. A flexible plastic material may be used with corrugated inner surface 102 formed thereon. While the corrugations could be the same shape as those noted hereinbefore a saw-tooth cross-section is illustrated to show that the locking feature can be obtained, although the hereinbefore designs are preferred for the advantages discussed therefor.

There has thus been disclosed a unique formable reusable enclosure which has been successfully used experimentally However, the forms of the invention herein shown and described are to be taken as illustrative only, and changes in the shape, size and arrangement of the components may be made without departing from the spirit and scope of the invention.

We claim:

1. A formable reusable enclosure for a container, comprising;
   (a) a pliable elongated panel member having opposed ends and tongue portion means extending from one of said opposed ends for connecting said opposed ends together,
   (b) said panel member including an outer layer of bendable kraft board and an inner layer of corrugated paper adhered to said kraft board,
   (c) said panel member being adapted to be formed into an enclosure extending around and gripping a container by bending said panel member into the configuration of the peripheral wall of the container with said tongue portion means overlapping the opposing end of said panel member,
   (d) said panel member having slot means formed therethrough for receiving said tongue portion means, said slot means being located adjacent the panel member end opposite to said tongue portion means end,
   (e) said slot means having an engagement edge aligned parallel to the corrugations in said corrugated paper layer of said tongue portion means, thereby enabling adjustment of the size of enclosure by selecting the desired corrugation for engagement with said slot edge, said selected corrugation locking against said edge when said tongue portion means is inclined at an acute angle with respect to said outer kraft paper layer preventing the tongue portion means for withdrawing from the slot.

2. An enclosure as defined in claim 1 in which said paper of said corrugated paper layer is sufficiently absorbent so that condensate from a container absorbed thereby will create a bond between said container and said paper which is sufficient to retain the container supported within said enclosure and spaced from a surface on which the enclosure is resting, thereby reducing condensate collection on said resting surface.

3. An enclosure as defined in claim 2 which further includes a closure means for forming a transverse wall in said enclosure, said closure means having a portion with the same peripheral configuration as said container thereby enabling said corrugated paper inner layer of said panel member to grip said closure means in the same fashion as a container is gripped.

4. A formable reusable enclosure which may be compactly stored and shipped, comprising;
   (a) a pliable elongated panel member having top, bottom, first end and second end edges, said panel member further including tongue portion means extending from one of said first and second end edges for connecting said end edges together, said panel member being adapted to be formed into an enclosure configuration by bringing said first and second end edges toward and past each other into a panel overlapping position with said tongue portion means on the outside and with said top and bottom edges defining upper and lower perimeters respectively of openings of the enclosure so formed;
   (b) said panel member having outer and inner surfaces when formed into an enclosure, said inner surface of at least said tongue portion means of said panel member having alternating ridges and grooves formed thereon to provide a corrugated surface, and
   (c) means for retaining said panel member in said enclosure configuration including slot means formed through said panel member adjacent the other of said first and second end edges for receiving said tongue portion means, said slot means having edge means for retaining corrugation grooves,
   (d) said tongue portion means being adapted to being inserted into said slot means in a position whereby a groove in said corrugated inside surface of said tongue portion means is engaged by said groove retaining edge means of said slot means to maintain said panel member in said enclosure configuration, said slot means comprising a closed end slot formed in said panel member between said top and bottom edges thereof, and said closed end slot has a length which is substantially the same as the width of a tongue portion to enhance the stability of said enclosure configuration.

5. A formable reusable enclosure which may be compactly stored and shipped, comprising;
(a) a pliable panel member having top, bottom, first end and second end edges, said panel member further including tongue portion means extending from one of said first and second end edges for connecting said end edges together, said panel member being adapted to be formed into an enclosure configuration by bringing said first and second end edges toward and past each other into a panel overlapping position with said tongue portion means on the outside and with said top and bottom edges defining upper and lower perimeters respectively of openings of the enclosure so formed;
(b) said panel member having outer and inner surfaces when formed into an enclosure, said inner surface of at least said tongue portion means of said panel member having alternating ridges and grooves formed thereon to provide a corrugated surface, and
(c) means for retaining said panel member in said enclosure configuration including slot means formed through said panel member adjacent the other of said first and second end edges for receiving said tongue portion means, said slot means having edge means for retaining corrugation grooves,
(d) said tongue portion means being adapted to being inserted into said slot means in a position whereby a groove in said corrugated inside surface of said tongue portion means is engaged by said groove retaining edge means of said slot means to maintain said panel member in said enclosure configuration, said slot means comprising a closed end slot formed in said panel member between said top and bottom edges thereof, and
said closed end slot has a width dimension that is slightly larger than a thickness dimension of said tongue portion means measured through a ridge of said corrugated surface, whereby the slot will readily admit said tongue portion means when said tongue portion means is substantially perpendicular to said panel member surrounding said slot but which will assist in moving a groove of said tongue portion means into engagement with said groove retaining edge of said slot when said corrugated surface of said tongue portion means is disposed at an acute angle with respect to said panel member.

6. A formable reusable enclosure which may be compactly stored and shipped, comprising;
(a) a pliable panel member having top, bottom, first end and second end edges, said panel member further including tongue portion means extending from one of said first and second end edges for connecting said end edges together, said panel member being adapted to be formed into an enclosure configuration by bringing said first and second end edges toward and past each other into a panel overlapping position with said tongue portion means on the outside and with said top and bottom edges defining upper and lower perimeters respectively of openings of the enclosure so formed;
(b) said panel member having outer and inner surfaces when formed into an enclosure, said inner surface of at least said tongue portion means of said panel member having alternating ridges and grooves formed thereon to provide a corrugated surface, and
(c) means for retaining said panel member in said enclosure configuration including slot means formed through said panel member adjacent the other of said first and second end edges for receiving said tongue portion means, said slot means having edge means for retaining corrugation grooves,
(d) said tongue portion means being adapted to being inserted into said slot means in a position whereby a groove in said corrugated inside surface of said tongue portion means is engaged by said groove retaining edge means of said slot means to maintain said panel member in said enclosure configuration, said slot means comprises an open-ended interlocking slot formed from one of said top and bottom edges to a location intermediate said edges;
said tongue portion means has a second open-ended interlocking tongue slot formed from an edge of said tongue portion means which is opposite to the edge of said panel member in which said first-mentioned interlocking slot is formed, the total length of said two interlocking slots being such that when the two slots are fully interengaged the top and bottom edges of said panel member are held in alignment at each end of said panel member, and
said tongue portion means interlocking slot has a width which spans a plurality of alternating ridges and grooves on the corrugated surface of said tongue portion means, thereby enabling as many adjustments in retained enclosure size as there are grooves which are spanned by said tongue slot.

7. A formable reusable enclosure particularly useful for enclosing beverage containers or to act as a container itself, comprising;
(a) a pliable panel member including an outer layer of bendable kraft board and an inner layer of corrugated paper adhered to said kraft board, said panel member having top, bottom, right and left edges and further including tongue portion means extending from one of said right and left edges for connecting said right and left edges into an enclosure,
(b) said panel member being adapted to be formed into an enclosure configuration around a container by overlapping said tongue portion over the other of said right and left edges,
(c) said panel member having slot means formed therethrough adjacent the end of said panel remote from said tongue portion means for receiving said tongue portion means and retaining said tongue portion means therein by engagement of said corrugation layer on said tongue means with an edge of said slot means, and
said slot means has a width substantially equal to the thickness of said kraft board and corrugated paper layers, whereby said tongue portion means is easily inserted into said slot means at an angle substantially perpendicular to the panel at said slot means, but when said corrugated paper layer is at an acute angle with respect to said panel at said slot means the engagement of a corrugation with a slot edge makes it very difficult to withdraw said tongue portion means from said slot means.

* * * * *